United States Patent [19]
Mika

[11] Patent Number: 6,013,113
[45] Date of Patent: Jan. 11, 2000

[54] SLOTTED INSULATOR FOR UNSEALED ELECTRODE EDGES IN ELECTROCHEMICAL CELLS

[75] Inventor: Mark L. Mika, Newfane, N.Y.

[73] Assignee: Wilson Greatbatch Ltd., Clarence, N.Y.

[21] Appl. No.: 09/036,272

[22] Filed: Mar. 6, 1998

[51] Int. Cl.[7] .................................................. H01M 2/26
[52] U.S. Cl. ........................ 29/623.1; 429/94; 429/211
[58] Field of Search ............................... 29/623.1, 623.2, 29/623.3, 623.4, 623.5; 429/127, 94, 130, 131, 132, 133, 136, 138, 139, 142, 144, 162, 211, 246

[56] References Cited

U.S. PATENT DOCUMENTS

| | | | |
|---|---|---|---|
| 2,157,629 | 5/1939 | Rolph | 136/147 |
| 2,954,417 | 9/1960 | Lehovec et al. | 136/13 |
| 4,049,882 | 9/1977 | Beatty | 429/94 |
| 4,327,163 | 4/1982 | Wheadon | 429/139 |
| 4,604,333 | 8/1986 | Ikeda et al. | 429/94 |
| 5,116,698 | 5/1992 | Sears | 429/94 |
| 5,486,215 | 1/1996 | Kelm et al. | 29/623 |
| 5,631,102 | 5/1997 | Spillman et al. | 429/94 |
| 5,853,914 | 12/1998 | Kawakami | 429/142 X |

*Primary Examiner*—Stephen Kalafut
*Assistant Examiner*—Susy Tsang
*Attorney, Agent, or Firm*—Hodgson, Russ, Andrews, Woods & Goodyear LLP

[57] ABSTRACT

In fabrication of conventional spirally wound cells, a length of separator is provided at least twice as long as one of the electrodes, for example, the cathode, and then folded to cover both sides of the electrode. The separator is also somewhat wider than the covered electrode to extend beyond the upper and lower edges thereof. The cathode assembly is then placed along side a strip of anode material and rolled into a jellyroll configuration. The separator sheet is not sealed at the opposed upper and lower edges of the cathode, and during high shock and vibration conditions the edges tend to mushroom which can lead to short circuit conditions. The insulator of the present invention is a slotted member that covers the upper and lower edges of the other electrode not covered by the separator, for example the anode with the anode leads extending through the slots to shield them from short circuit conditions with the cell casing or other leads if the cell should be subjected to severe shock forces and the like.

31 Claims, 2 Drawing Sheets

SLOTTED INSULATOR FOR UNSEALED ELECTRODE EDGES IN ELECTROCHEMICAL CELLS

BACKGROUND OF THE INVENTION

1. Field of the Invention

The present invention generally relates to electrochemical cells, and more particularly, to a slotted insulator sheet provided in conjunction with a primary separator for preventing short circuiting of a cell under severe shock and vibration conditions, and the like.

The insulator is preferably used in conjunction with the primary separator positioned intermediate the anode and the cathode and not sealed to completely envelope either of the electrodes. The insulator of the present invention includes slots that surround the leads of one of the electrodes with a portion of the insulator sheet overlapping the primary separator to completely cover that electrode. That way, the slotted insulator in conjunction with the primary separator prevents the covered electrode from creating a short circuit condition by contacting the counter electrode or its terminal lead. For example, in a case-terminal electrode configuration with the primary separator positioned intermediate the electrodes but not completely covering either of them, should the counter electrode not terminally connected to the casing contact any one of the interior case wall, the case-terminal electrode, or the intermediate terminal lead, a short circuit will ensue. The slotted separator of the present invention is provided to prevent this from happening, particularly in a spirally wound electrode assembly.

2. Prior Art

Spirally wound electrochemical cells are manufactured from anode and cathode electrodes provided in elongate sheet or strip form having a separator material disposed therebetween and rolled up in a jellyroll-type manner. Even though the separator is wider and longer than both of the electrodes, due to manufacturing considerations, in some jellyroll constructions the separator is not sealed to envelope either of them. That can lead to short circuiting of the spirally wound electrochemical cell when one electrode telescopes or otherwise moves past the peripheral edge of the separator and comes into direct contact with the other electrode or its terminal assembly. Internal short circuiting of a cell is one of the problems that, if it occurs, results is malfunctioning of the cell and can render the associated device inoperable.

Thus, there is a need for an additional insulator structure in an electrode assembly provided at the edge of one or both of the electrodes not sealed or completely enveloped by a primary separator. Such an insulator structure is particularly useful in spirally wound and prismatic electrode configurations.

SUMMARY OF THE INVENTION

It is, therefore, an object of the present invention to provide a sheet that is slotted to receive and cover a portion of the terminal lead of either an anode or a cathode electrode as an additional insulating structure in conjunction with an unsealed, primary separator positioned intermediate the two electrodes. The electrodes can be associated with each other in a spirally wound, prismatic, or other assembly. Prior to associating the electrodes with each other in the desired assembly configuration, the slotted insulator sheet is fitted over the leads of one of the electrodes, for example the anode leads intended to be contacted to the casing in a case-negative design. In the case-negative configuration, the anode leads penetrate through the slots of the insulator sheet which overlaps the primary insulator in a manner to effectively shield the leads and the casing from the counter, cathode electrode.

The foregoing and additional advantages and characterizing features of the present invention will become readily apparent to those of ordinary skill in the art by reference to the following description and to the drawings.

DETAILED DESCRIPTION OF THE PREFERRED EMBODIMENT.

Figure 3:
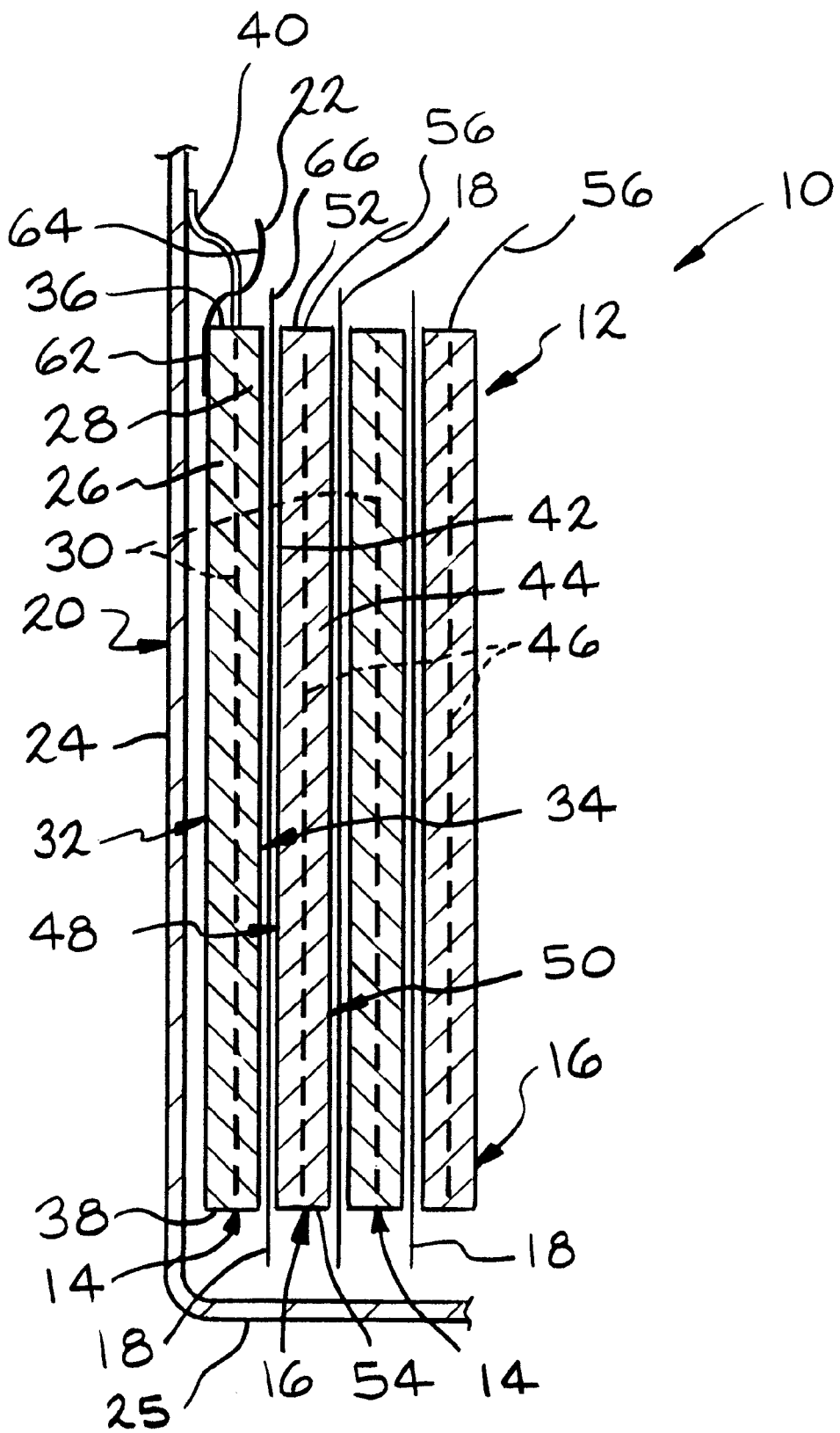
FIG. 3 is a partial, cross-sectional view of a jellyroll electrode assembly 12 having the electrode 14 and lead 40 shielded from contact with the counter electrode 16 by the insulator 22 according to the present invention.

Referring now to the drawings, FIG. 3 is a partial, cross-sectional view of an exemplary electrochemical cell 10 according to the present invention comprising an electrode assembly 12 including a first electrode 14 and a second, counter electrode 16 having a primary separator 18 disposed therebetween and housed inside of a casing 20. As will be described in detail presently, the primary separator 18 in conjunction with an insulator sheet 22 according to the present invention ensures complete and reliable isolation of the first and second electrodes 14 and 16 from each other.

It should be pointed out that the electrode assembly 12 can have a prismatic configuration wherein the first electrode 16 has a serpentine shape provided with plates of the counter electrode 16 disposed therebetween, or a spirally wound electrode assembly having a jellyroll configuration. In any event, the primary separator 18 and the insulator 22 are of a woven or non-woven sheet or cloth of electrically insulative material positioned to ensure physical and electrical separation between the electrodes. The primary separator 18 and the insulator 22 also have a degree of porosity to allow flow therethrough of an activating electrolyte during the electrochemical reaction of the cell.

Thus, while the present invention is equally applicable to both spirally wound and prismatic configurations, the structure and function of the insulator 22 will be described with respect to the former assembly. In that event, the electrode assembly 12 is housed inside of the casing 20 (partially shown in FIG. 3) which includes a cylindrically-shaped side wall 24 extending to and meeting with a bottom wall 25. The first electrode 14 includes sheets or plates 26, 28 of active material pressed or otherwise contacted to an intermediate current collector 30 (shown in dashed lines in FIG. 3) such that the electrode 14 comprises spaced apart major faces 32 and 34 extending to and meeting with an upper edge 36 and a lower edge 38. A lead 40 extends from the upper edge 36. The lead 40 can be integral with the current collector 30 or contacted thereto such as by welding.

The second or counter electrode 16 is similarly formed of sheets or plates 42, 44 of active material contacted to an intermediate current collector 46 (shown in dashed lines in FIG. 3) to provide the counter electrode having spaced apart major faces 48 and 50 extending to and meeting with an upper edge 52 and a lower edge 54. The counter electrode also has leads 56 extending from the current collector 46 and contacted to a terminal (not shown) for that electrode.

An important aspect of the present invention is that in the exemplary cell 10 neither the upper or lower edges 36 and 38 of the first electrode or the upper or lower edges 52 and 54 of the counter electrode are enclosed or sealed by the primary separator 18. Instead, the separator 18 is of a size sufficient to extend beyond the width and length of both of the electrodes, leaving the respective upper and lower edges thereof unsealed or uncovered.

In the spirally wound configuration, the jellyroll electrode assembly 12 is fabricated from a length of the primary separator 18 that is twice as long as one of the electrodes, for example the counter electrode 16, and then folded to cover both sides of that electrode. The first electrode 14 and the counter electrode 16 are laid one on top of the other having the primary separator 18 disposed therebetween. This electrode sandwich is then rolled into the jellyroll structure. In a prismatic configuration, two sheets of the primary separator are disposed on either side of one of the electrodes which is folded into a serpentine configuration. Plates of the counter electrode are then interleaved between the folds. In either construction, if the primary separator 18 is not sealed at the upper and lower edges 36 and 38 of the first electrode 14 and at the upper and lower edges 52 and 54 of the counter electrode 16 such that both of the electrodes are uncovered and exposed at the edges, there is the possibility of a short circuit condition occurring. Leaving the primary separator unsealed at the electrode edges is a manufacturing consideration as sealing the separator 18 adds cost to the cell assembly. However, should such a cell 10 be subjected to high shock and vibration conditions and the like, one of the electrodes, for example the counter electrode 16, could move or slide with respect to the first electrode 14 such that the upper edge 52 of the counter electrode 16 telescopes past the primary separator 18. In that event, the counter electrode 16 could contact the first electrode 14, the first electrode's lead 40 or the casing 20 to create a short circuit condition.

Figure 1:
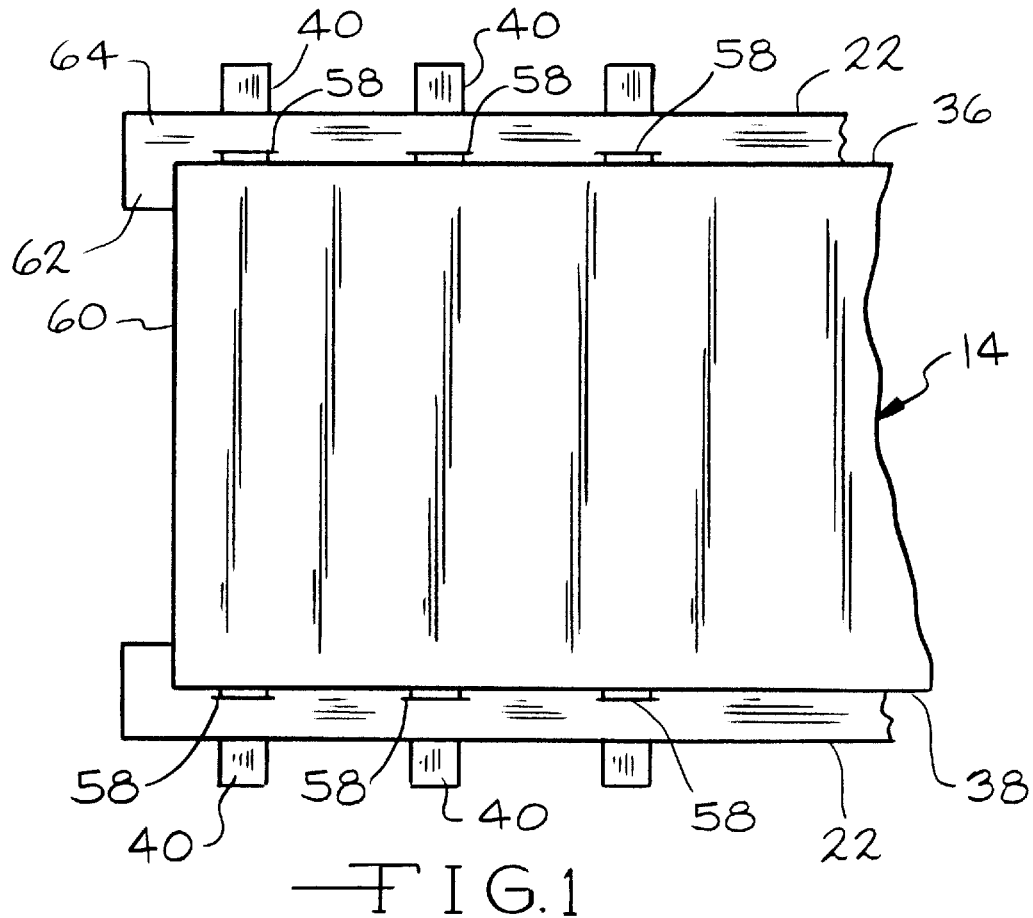
FIG. 1 is a partial side-elevational view of an electrode 14 provided with an insulator 22 covering the electrode leads 40 according to the present invention.
Figure 2:
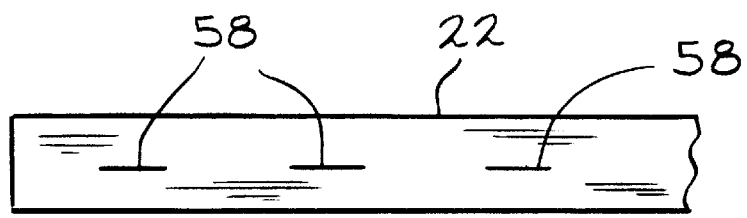
FIG. 2 is a plan view of the slotted insulator 22 shown in FIG. 1.

To prevent this from occurring, the insulator 22 in the form of a sheet is provided to cover the upper edge 36 of the first electrode 14. As shown in FIGS. 1 to 3, the insulator sheet 22 is provided with slots 58 of a size and shape to snugly receive the leads 40 of the first electrode 14. If the first electrode 14 is intended to be associated with the counter electrode 16 in a spirally wound configuration housed inside the casing 20 serving as the terminal for the first electrode 14, that electrode is provided with a plurality of leads 40 extending from at least the upper edge 36 beginning proximate a leading edge 60 (FIG. 1) thereof. The slots 58 are provided in the insulator 22 at intervals corresponding to the distance between the leads 40. FIG. 1 shows leads 40 extending from both the upper and lower edges 36 and 38 of the first electrode 14. In any event, in a spirally wound electrode configuration there are typically only as many leads 40 extending from either the upper and/or lower edges 36, 38 of the first electrode 14 as are necessarily to contact the outermost portion of the wind to the casing 20. In other words, those portions of the first electrode 14 that have both major faces in operative association with or are covered by the counter electrode 16 are not usually provided with leads extending therefrom.

The insulator 22 is fitted over the leads 40 with a first portion 62 of the insulator covering a portion of the first major face 32 of the first electrode 14 that will eventually face the side wall 24 of the casing 20 in the jellyroll wind. A second portion 64 of the insulator 22 overlaps in a closely spaced relationship that portion of the primary separator 18 disposed intermediate the first and second electrodes 14 and 16. An important aspect of the present invention is that the second portion 64 of the insulator 22 has a size sufficient to extend beyond the end 66 of the primary separator and along the lead 40 to effectively segregate the lead 40 and the first electrode 14 from the second electrode 16. While not shown in the drawings, the second portion 64 of the insulator 22 can also contact the primary separator 18. Then, as shown in FIG. 3, with the first electrode 14 operatively associated with the counter electrode 16, whether in a spirally wound or prismatic configuration, the upper edge 36 of the first electrode 14 is isolated or enveloped from the counter electrode 16 by the second portion 64 of the insulator 22 in conjunction with the proximate portion of the primary separator 18. As shown in FIG. 1, in those assemblies having leads 38 extending from the bottom edge 40 of the first electrode 14, a slotted insulator 22 according to the present invention is provided there also.

By way of example, in an illustrative electrochemical cell according to the present invention, the anode active material is an alkali metal selected from Groups IA, IIA and IIIA of the Periodic Table of Elements and contacted to a nickel current collector, and the cathode active material is of a carbonaceous material, fluorinated carbon, metal, metal oxide, mixed metal oxide or a metal sulfide, and mixtures thereof. Preferably, the cathode material is mixed with a conductive diluent such as carbon black, graphite or acetylene black or metallic powders such as nickel, aluminum, titanium and stainless steel, and with a fluoro-resin powder binder material such as powdered polytetrafluroethylene or powdered polyvinylidene fluoride. The thusly prepared cathode active admixture is contacted to the cathode current collector which is a thin sheet or metal screen, for example, a titanium, stainless steel, aluminum or nickel screen.

The material of the insulator 22 is preferably, but not necessarily, similar to that of the primary separator 18. In that respect, the insulator 22 and the primary separator 18 are of electrically insulative materials that are chemically unreactive with the anode and cathode materials and both chemically unreactive with and insoluble in the electrolyte. In addition, the separator and insulator materials have a degree of porosity sufficient to allow flow therethrough of the electrolyte during the electrochemical reaction of the cell. Illustrative separator and insulator materials include woven and non-woven fabrics of polyolefinic fibers or fluoropolymeric fibers including polyvinylidene fluoride, polyethylenetetrafluoroethylene, and polyethylenechlorotri-fluoroethylene laminated or superposed with a polyolefinic or a fluoropolymeric microporous film. Suitable microporous films include a polytetrafluoroethylene membrane commercially available under the designation ZITEX (Chemplast Inc.), polypropylene membrane commercially available under the designation CELGARD (Celanese Plastic Company, Inc.) and a membrane commercially available under the designation DEXIGLAS (C.H. Dexter, Div., Dexter Corp.). The separator 18 and the insulator 22 may also be composed of non-woven glass, glass fiber materials and ceramic materials. The preferred materials for the slotted insulator 22 are fluororesin polymers such as polyethylenetetrafluoroethylene, which is commercially available under the name TEFZEL, a trademark of the DuPont Company.

A suitable electrolyte for an alkali metal active anode has an inorganic or organic, ionically conductive salt dissolved in a nonaqueous solvent, and more preferably, the electrolyte includes an ionizable alkali metal salt dissolved in a mixture of aprotic organic solvents comprising a low viscosity solvent and a high permittivity solvent. The tonically conductive salt serves as the vehicle for migration of the anode ions to intercalate or react with the cathode active material. Preferably the ion-forming alkali metal salt is similar to the alkali metal comprising the anode.

The preferred form of the electrode assembly of the present invention is a case-negative design wherein the anode/cathode couple is inserted into the conductive metal casing 20 such that the casing is connected to the anode current collector 30 via anode leads 40, as is well known to those skilled in the art. A preferred material for the casing 20 is titanium although stainless steel, mild steel, nickel-plated mild steel and aluminum are also suitable. While not shown in the drawings, a header seals the casing 20 and comprises a metallic lid having a sufficient number of openings to accommodate a glass-to-metal seal/terminal pin feedthrough connected to the cathode electrode 16 via cathode leads 56. An additional opening (not shown) is provided for electrolyte filling.

The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto.

The cell of the present invention can also be constructed in a case-positive design. Further, the electrode assembly of the present invention including the slotted insulator 22 used in conjunction with the primary separator 18 is readily adaptable to both primary and secondary, rechargeable electrochemical chemistries.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
   (a) a first electrode having spaced apart major faces extending to and meeting with an upper edge and a lower edge joining with a leading edge and an ending edge, wherein at least two leads extend outwardly at spaced intervals from at least one of the upper edge, the lower edge, the leading edge and the ending edge of the first electrode, and wherein the at least two leads are connected to a terminal for the first electrode;
   (b) a counter electrode operatively associated with the first electrode;
   (c) a separator disposed between at least one of the spaced apart major faces of the first electrode and the counter electrode, wherein the separator is unsealed at the edge having the leads extending from the first electrode so as not to completely envelope a length of the first electrode adjacent to the leads and the spaced interval between them; and
   (d) an insulator sheet having a length and a width sufficient to cover the length of the unsealed edge having the leads, wherein the insulator sheet includes at least two slots sized and shaped to snugly receive the at least two leads, and wherein a portion of the insulator sheet overlaps the separator to segregate the first electrode and its leads from the counter electrode.

2. The electrochemical cell of claim 1 wherein the insulator sheet is of a woven or non-woven fabric.

3. The electrochemical cell of claim 1 wherein the insulator sheet is of a fluororesin material.

4. The electrochemical cell of claim 1 wherein the insulator sheet is of polyethylenetetrafluoroethylene.

5. The electrochemical cell of claim 1 wherein the first electrode has a plurality of leads extending therefrom and the insulator sheet has a corresponding number of slots receiving the respective leads.

6. The electrochemical cell of claim 1 wherein there are at least two leads extending from each of the upper and lower edges with corresponding insulator sheets provided to segregate the counter electrode from the upper and the lower edges of the first electrode and the leads extending therefrom with the insulator sheets overlapping a portion of the separator disposed between the first and counter electrodes proximate the spaced apart upper and lower edges thereof.

7. The electrochemical cell of claim 1 wherein the counter electrode is a cathode.

8. The electrochemical cell of claim 7 wherein the cathode comprises an active material selected from the group consisting of a metal, a metal oxide, a mixed metal oxide, a metal sulfide, a carbonaceous material, a fluorinated carbon, and mixtures thereof.

9. The electrochemical cell of claim 1 wherein the first electrode, the counter electrode and the intermediate separator are provided in a jellyroll electrode wind with a plurality of leads extending from at least one of the upper edge, the lower edge, the leading edge and the ending edge of the first electrode and connected to a casing housing the electrode assembly and serving as a terminal for the first electrode.

10. The electrochemical cell of claim 9 wherein the casing has a cylindrical shape and wherein there are a plurality of leads extending from the at least one edge of the first electrode to contact an outermost portion of the first electrode in the jellyroll wind to the casing.

11. The electrochemical cell of claim 1 wherein the first electrode, the counter electrode and the intermediate separator are provided in a prismatic configuration.

12. The electrochemical cell of claim 1 wherein the first electrode is an anode comprising an active material selected from the group consisting of Groups IA, IIA and IIIA of the Periodic Table of Elements.

13. An electrochemical cell, comprising:
   (a) a first electrode having a lead extending outwardly from the electrode, wherein the lead is connected to a terminal for the first electrode;
   (b) a counter electrode operatively associated with the first electrode;
   (c) a separator disposed between the first electrode and the counter electrode, wherein the separator is unsealed adjacent to the lead extending from the first electrode so as not to completely envelope either one of the first electrode adjacent to the lead and the counter electrode; and
   (d) an insulator that surrounds the lead of the first electrode, wherein a portion of the insulator overlaps the separator to segregate the first electrode and the lead from the counter electrode and wherein the lead extends from an edge of the first electrode with the insulator surrounding the lead covering the edge to segregate the first electrode and lead from the counter electrode.

14. An electrochemical cell, comprising:
   (a) a first electrode having a lead extending outwardly from the electrode, wherein the lead is connected to a terminal for the first electrode;
   (b) a counter electrode operatively associated with the first electrode;

(c) a separator disposed between the first electrode and the counter electrode, wherein the separator is unsealed adjacent to the lead extending from the first electrode so as not to completely envelope either one of the first electrode adjacent to the lead and the counter electrode; and (d) an insulator that surrounds the lead of the first electrode, wherein a portion of the insulator overlaps the separator to segregate the first electrode and the lead from the counter electrode and wherein the insulator is a sheet of insulation material provided with a slot that received the first electrode lead.

15. An electrochemical cell, comprising:

(a) a first electrode having a lead extending outwardly from the electrode, wherein the lead is connected to a terminal for the first electrode;

(b) a counter electrode operatively associated with the first electrode;

(c) a separator disposed between the first electrode and the counter electrode, wherein the separator is unsealed adjacent to the lead extending from the first electrode so as not to completely envelope either one of the first electrode adjacent to the lead and the counter electrode; and (d) an insulator that surrounds the lead of the first electrode, wherein a portion of the insulator overlaps the separator to segregate the first electrode and the lead from the counter electrode and wherein the first electrode has a plurality of leads extending therefrom and the insulator has a corresponding number of slots receiving the respective leads.

16. A method for providing an electrochemical cell resistant to internal short circuiting, the method comprising the steps of:

(a) providing a casing;

(b) providing a first electrode having a lead extending outwardly from the electrode and connected to a terminal for the first electrode;

(c) providing a counter electrode operatively associated with the first electrode;

(d) disposing a separator between the first electrode and the counter electrode to provide an electrode assembly, wherein the separator is not sealed so as to completely envelope either one of the first electrode and the counter electrode;

(e) insulating the first electrode and the lead from the counter electrode with an insulator surrounding the lead, wherein a portion of the insulator overlaps the separator to segregate the first electrode and the lead from the counter electrode and wherein the lead extending from an edge of the first electrode with the insulator surrounding the lead covering the edge to segregate the first electrode and the lead from the counter electrode; and (f) housing the electrode assembly inside the casing activated with an electrolyte.

17. A method for providing an electrochemical cell resistant to internal short circuiting, the method comprising the steps of:

(a) providing a casing;

(b) providing a first electrode having spaced apart major faces extending to and meeting with an upper edge and a lower edge joining with a leading edge and an ending edge, wherein at least two leads extend outwardly at spaced intervals from at least one of the upper edge, the lower edge, the leading edge and the ending edge of the first electrode and are connected to a terminal for the first electrode;

(c) providing a counter electrode operatively associated with the first electrode;

(d) disposing a separator between at least one of the spaced apart major faces of the first electrode and the counter electrode to provide an electrode assembly, wherein the separator is not sealed at the edge having the leads so as to not completely envelope a length of the first electrode adjacent to the leads and the spaced interval between them;

(e) insulating the first electrode and the leads from the counter electrode with an insulator sheet having a length and a width sufficient to cover the length of the unsealed edge having the leads, wherein the insulator sheet includes at least two slots sized and shaped to snugly receive the at least two leads, and wherein a portion of the insulator sheet overlaps the separator to segregate the first electrode and its leads from the counter electrode; and (f) housing the electrode assembly inside the casing activated with an electrolyte.

18. The method of claim 17 including providing the insulator sheet of a woven or non-woven fabric.

19. The method of claim 17 including providing the insulator sheet of a fluororesin material.

20. The method of claim 17 including providing the insulator sheet of polyethylenetetrafluoroethylene.

21. The method of claim 17 including providing the first electrode having a plurality of electrode leads extending therefrom and the insulator sheet having a corresponding number of slots receiving the respective leads.

22. The method of claim 17 including providing at least two leads extending from each of the upper and the lower edges with corresponding insulator sheets segregating the counter electrode from the upper and the lower edges of the first electrode and the leads extending therefrom with the insulator sheets overlapping a portion of the separator disposed between the first and the counter electrodes proximate the spaced apart upper and lower edges thereof.

23. The method of claim 17 including providing the first electrode, the counter electrode and the intermediate separator in a jellyroll electrode wind with a plurality of leads extending from at least one of the upper edge, the lower edge, the leading edge and the ending edge of the first electrode and connected to a casing housing the electrode assembly and serving as a terminal for the first electrode.

24. The method of claim 17 including providing the casing having a cylindrical shape and wherein there are a plurality of leads extending from the at least one edge of the first electrode to contact an outermost portion of the first electrode in the jellyroll wind to the casing.

25. The method of claim 17 including providing the first electrode, the counter electrode and the intermediate separator in a prismatic configuration.

26. The method of claim 17 including providing the first electrode as an anode.

27. The method of claim 26 including selecting an anode active material from the group consisting of Groups IA, IIA and IIIA of the Periodic Table of Elements.

28. The method of claim 17 including providing the second electrode as a cathode.

29. The method of claim 28 including selecting the cathode from the group consisting of a metal, a metal oxide, a mixed metal oxide, a metal sulfide, a carbonaceous material, a fluorinated carbon, and mixtures thereof.

30. A method for providing an electrochemical cell resistant to internal short circuiting, the method comprising the steps of:

(a) providing a casing;

(b) providing a first electrode having a lead extending outwardly from the electrode and connected to a terminal for the first electrode;

(c) providing a counter electrode operatively associated with the first electrode;

(d) disposing a separator between the first electrode and the counter electrode to provide an electrode assembly, wherein the separator is not sealed so as to completely envelope either one of the first electrode and the counter electrode;

(e) insulating the first electrode and the lead from the counter electrode with an insulator surrounding the lead, wherein a portion of the insulator overlaps the separator to segregate the first electrode and the lead from the counter electrode and wherein the insulator is a sheet of insulation material provided with a slot that received the first electrode lead; and (f) housing the electrode assembly inside the casing activated with an electrolyte.

31. A method for providing an electrochemical cell resistant to internal short circuiting, the method comprising the steps of:

(a) providing a casing;

(b) providing a first electrode having a lead extending outwardly from the electrode and connected to a terminal for the first electrode;

(c) providing a counter electrode operatively associated with the first electrode;

(d) disposing a separator between the first electrode and the counter electrode to provide an electrode assembly, wherein the separator is not sealed so as to completely envelope either one of the first electrode and the counter electrode;

(e) insulating the first electrode and the lead from the counter electrode with an insulator surrounding the lead, wherein a portion of the insulator overlaps the separator to segregate the first electrode and the lead from the counter electrode and wherein the first electrode having a plurality of electrode leads extending therefrom and the insulator having a corresponding number of slots receiving the respective leads; and (f) housing the electrode assembly inside the casing activated with an electrolyte.

* * * * *